United States Patent Office 3,504,482
Patented Apr. 7, 1970

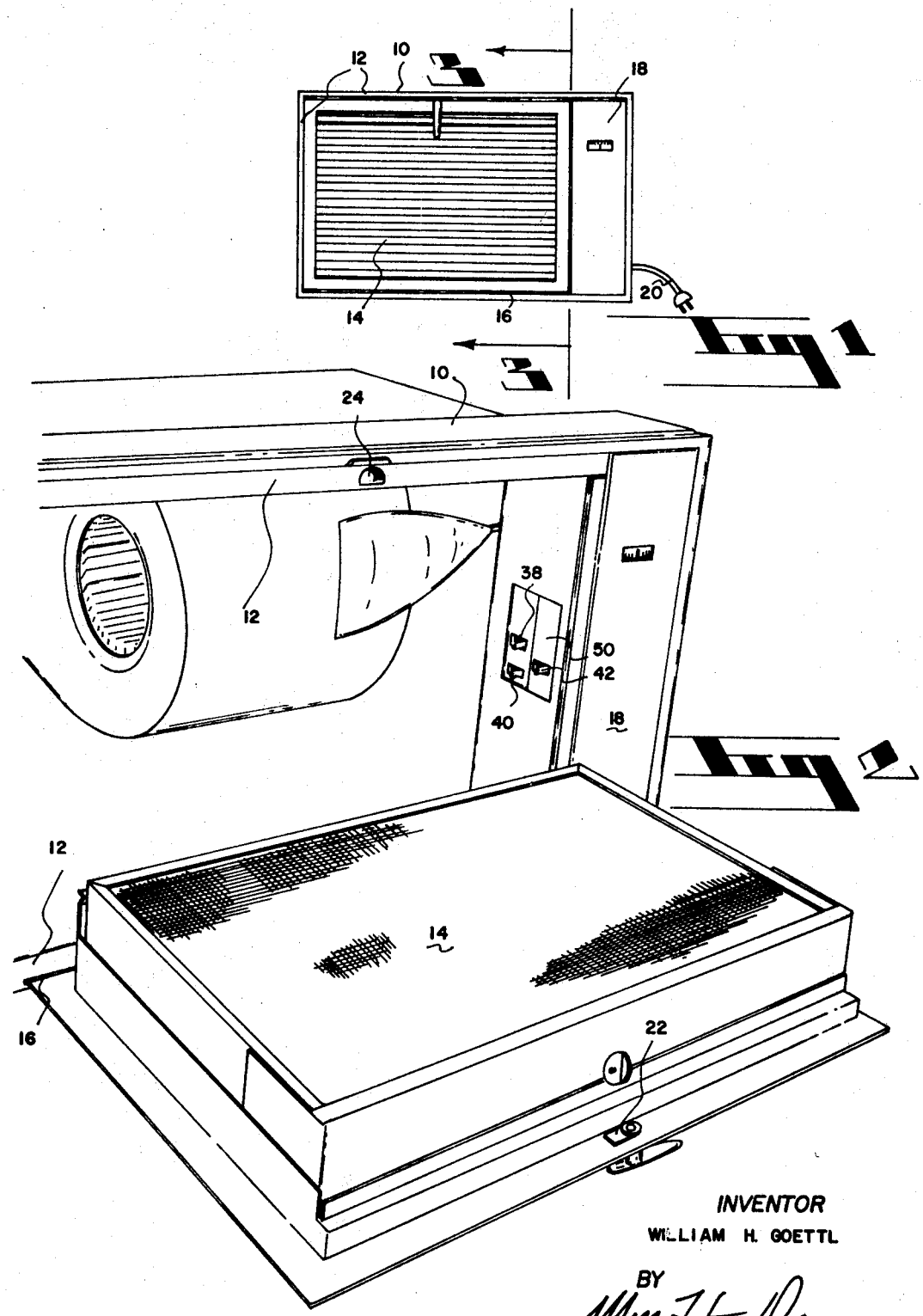

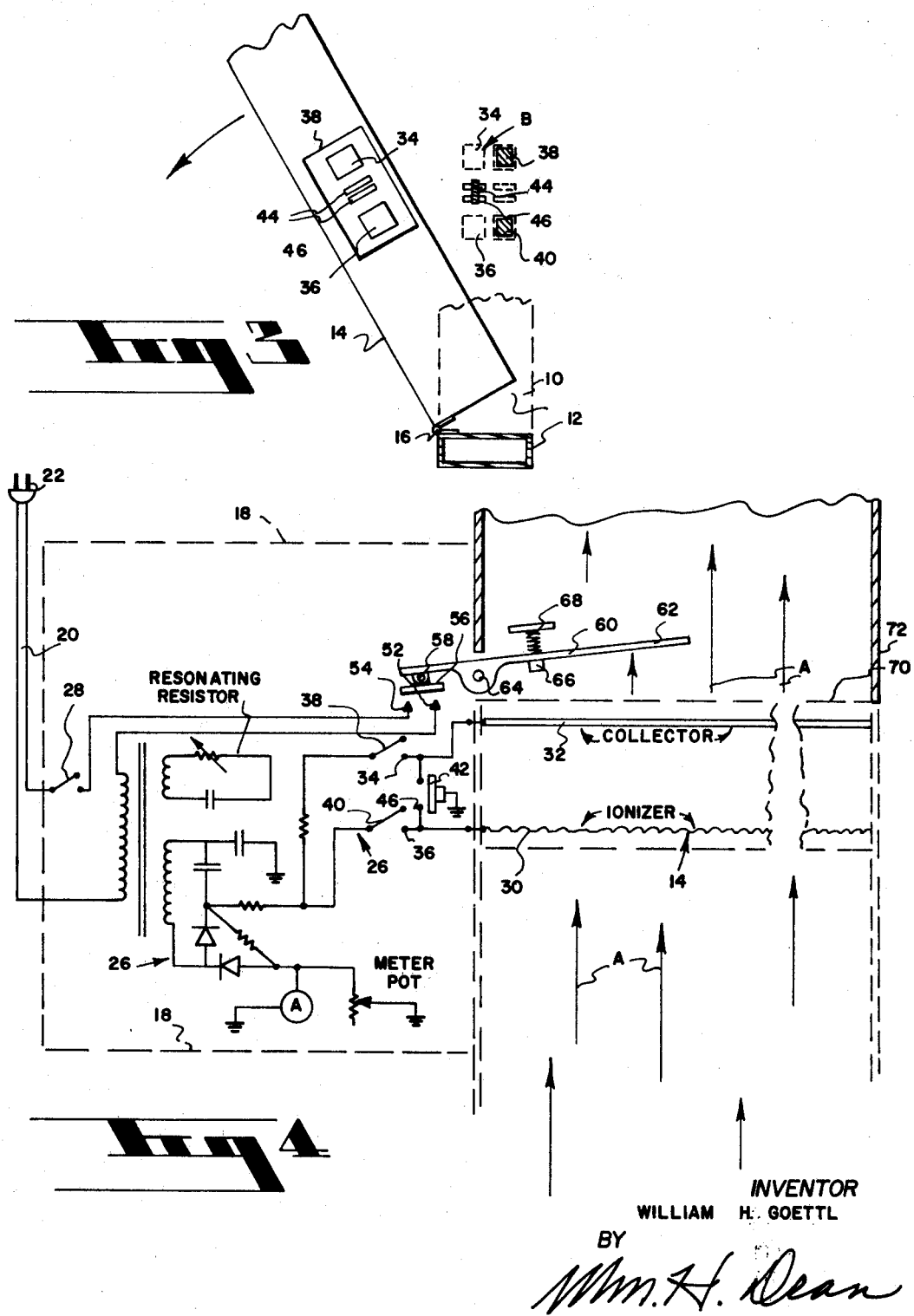

3,504,482
ELECTROSTATIC AIR CLEANER AND CONTROL MEANS THEREFOR
William H. Goettl, 4627 N. Granite Reef Road,
Scottsdale, Ariz. 85251
Filed Jan. 22, 1965, Ser. No. 427,221
Int. Cl. B03c 3/02
U.S. Cl. 55—139          7 Claims

ABSTRACT OF THE DISCLOSURE

An electrostatic precipitator installed in a building heating system return air duct having a flow sensing means to de-energize the precipitator upon predetermined decrease in air flow rate in the system. The electrostatic precipitator having a grounding means to ground the precipitator to dissipate residual charges therein as the precipitator is removed from the system.

---

This invention relates to an electrostatic air cleaner and control means therefor.

Electrostatic air cleaners are generally used to collect very fine particulate matter from air in air conditioning systems and are so energized as to generate ozone at times when a minimum air flow condition exists relative to such electrostatic air cleaners.

The generation of ozone by one of these units internally of a building room may cause dangerous atmospheric conditions and therefore various prior art devices have been employed for the purpose of insuring air flow across electrostatic air cleaners to maintain them at a safe condition so that a concentration of ozone is not created in the area of the electrostatic air cleaner. Prior art systems have included means coupled to blowers and particularly blower motors for the purpose of de-energizing such electrostatic air cleaners when the blower motors are inoperative.

In such prior art systems a common hazard exists when a belt connecting the motor and the blower fails and when the motor continues to operate. This condition, of course, causes a minimum air flow condition to occur, namely, one in which the blower does not move any air through the air flow path in which the electrostatic air cleaner is disposed. In this condition, the electrostatic air cleaner continues to be energized, its temperature increases and ozone is created in the area of the cleaner. Thus, the ozone concentration may reach a dangerous condition in a building room. The prior art systems have also been expensive since each electrostatic air cleaner must include custom installation of the electrical wiring related to various blowers and motors of existing air conditioning systems. Some of these systems include two blowers or a plurality of blowers for the heating and the refrigeration systems and, accordingly, the coupling of an electrostatic air cleaner to both the systems alternately to operate in the summer and winter becomes very complicated and expensive to install. All of this has been a condition of prior art installations due to the fact that such prior art systems have relied upon controlling the electrostatic air cleaner in response to blower motor operation.

Accordingly, it is an object of the present invention to provide a very simple electrostatic air cleaner control means wherein an air flow responsive means in the air flow path relative to the electrostatic air cleaner provides for de-energization of the electrostatic air cleaner when air flow reaches a predetermined minimum value.

Another object of the invention is to provide an electrostatic air cleaner and control means wherein an electrostatic air cleaner assembly is mounted in a frame also carrying an energizing source for the electrostatic air cleaner and also an air flow responsive switch means, whereby power supplied to the electrostatic air cleaner may be in the form of a conventional extension cord having a plug which fits into a conventional wall outlet, whereby de-energization of the electrostatic air cleaner may automatically take place when a minimum air flow condition is sensed by the air flow responsive switch means in response to a minimum air flow relative to the electrostatic air cleaner.

Another object of the invention is to provide a novel means for grounding the static charge on an electrostatic air cleaner when it is moved relative to a supporting frame for service.

Another object of the invention is to provide a novel electrostatic air cleaner which may form a return grill for the inlet of an air flow return duct of an air conditioning system which has its inlet communicating with the interior of a building room.

Another object of the invention is to provide an electrostatic air cleaner which is very economical to produce and install since it requires no cooperative electrical coupling or wiring relative to air conditioning system blower motors, or the like.

Another object of the invention is to provide a very safe electrostatic air cleaner controlled by an air flow responsive switch responsive to air flow relative to the electrostatic air cleaner and which electrostatic air cleaner requires only an electrical connection to a conventional household or commercial power supply.

Further objects and advantages of the invention may be apparent from the following specification, appended claims and accompanying drawings, in which:

FIG. 1 is a front elevational view of an electrostatic air cleaner in accordance with the present invention;

FIG. 2 is a front perspective view of an electrostatic air cleaner in accordance with the present invention and showing an electrostatic assembly structure pivoted in open position relative to an air flow path of a frame of the invention which frame is disposed at an air return inlet of an air conditioning system;

FIG. 3 is an enlarged fragmentary sectional view taken from the line 3—3 of FIG. 1, showing electrical contacts for conducting energy to the electrostatic air cleaner of the invention and also for automatically grounding the static charge of the assembly during an opening movement of the electrostatic assembly relative to the frame of the invention so that when the unit is open, the static charge is relieved from the unit to prevent shock to any person who may touch the electrostatic assembly; and FIG. 4 is a diagrammatic view of the electrical wiring and controls coupled to an electrostatic air cleaner of the invention and illustrating air flow path means in relation to the electrostatic air cleaner of the invention.

As shown in FIG. 1 of the drawings, the electrostatic air cleaner of the invention is provided with a frame 10 having an opening 12 in which an electrostatic air cleaning assembly 14 is movably mounted by means of a horizontally disposed hinge 16 at the lower portion of the assembly 14.

A housing portion 18 of the frame 10 encloses the conventional electrostatic energizing circuitry of the invention for energizing the electrostatic assembly 14, all as will be hereinafter described.

A power conductor cord 20 is provided with male conductor prongs 22 adapted to be plugged into a conventional household power outlet and this cord 20 is adapted to conduct electrical energy to the electrostatic charging circuitry contained in the housing 18, as will be hereinafter described in detail.

As shown in FIG. 2 of the drawings, the assembly 14 is pivoted about the axis of the hinge 16 into open position relative to the opening 12 in the frame 10, said opening 12 forming a part of an air flow path according to the present invention.

The assembly 14 may be moved to the open position, as shown in FIG. 2, substantially out of the air flow path for the purpose of removing the assembly 14 and cleaning it periodically.

The assembly is provided with a latch 22 engageable with a complemental latch 24 for holding the assembly 14 in closed position, as shown in FIG. 1, relative to the opening 12 and in an air flow path for the purpose of filtering air which may pass in the air flow path and which flow may be induced by a conventional blower 24, as shown in FIG. 2, which blower may cause air flow in the direction of arrows A, as shown in FIG. 4 of the drawings, With specific reference to FIG. 4, it will be seen that the housing 18 contains a conventional electrostatic energizing circuit 26 supplied power through the cord 20, as hereinbefore described. The electrostatic charging circuit 26 is provided with a power interrupting switch 28 which is normally closed when the assembly 14 is in closed position, as shown in FIG. 1, and open when the assembly 14 is in the open position, shown in FIG. 2, so that power coupled to the conductor cord 20 does not flow into the circuitry 26 when the assembly 14 is in open position, as will be hereinafter described.

The assembly 14 is provided with a conventional ionizer 30 and a conventional collector 32, the collector 32 being coupled to a movable contact 34 and the ionizer 30 being coupled to a conventional movable contact 36, these being shown in FIG. 3 of the drawings, and carried on an insulating plate 38 of the assembly 14. These contacts 34 and 36 are engageable with complemental contacts 38 and 40 when the assembly 14 is in the closed position, as shown in FIG. 1, and as shown in FIG. 3 and in FIG. 2, the contacts 34 and 36 are disconnected from the contacts 38 and 40, respectively, when the assembly 14 is in the open position.

A grounding contact 42 is connected to ground and is laterally spaced relative to the contacts 34 and 36 and 38 and 40, respectively, when the assembly 14 is in closed position so that when it is moved toward open position, contacts 44 and 46 coupled to the collector and ionizer and carried by the plate 38 brush the contact 42 and thereby relieve the static charge from the assembly 14 before it reaches a full open position, as shown in FIG. 2. This grounding contact occurs when the contacts 34 and 36 and the contacts 44 and 46 are in a position, as indicated at B in FIG. 3 of the drawings.

It will be seen that the contacts 38 and 40 are stationarily mounted in an insulating plate structure 50 carried by the housing 18 in one side of the opening 12 of the flame and that the grounding contact 42 is also carried on this insulating plate 50. With reference to FIGS. 2 and 3 of the drawings, the disposition and operation of the foregoing contacts may readily be discerned.

Coupled in series with the switch 28 is a pair of contacts 52 and 54 which when connected in closed circuit with the switch 28 conduct power to the electrostatic energizing circuit 26. Thus, when the switch 28 and the contacts 52 and 54 are coupled in closed position, electrical energy may be transmitted through the conductor cord 20 to energize the electrostatic energizing circuit 26.

A bridge contact 56 is maintained in normally open position relative to the contacts 52 and 54 and is coupled to one end 58 of a lever 60 having an aerodynamic air flow sensing plate 62 coupled thereto. The lever 60 is pivoted at 64 and held against a stop 66 by means of a compression spring 68. When sufficient air flow, more than a minimum amount, is passing, as indicated by arrows A through the flow path of the invention, aerodynamic air flow impinges on the air responsive member 62 which is thus moved in the same direction as the arrows A causing the bridge contact 56 to close against the contacts 52 and 54 and couple the same to complete a circuit to the electrostatic energizing circuit 26 and to thereby complete a circuit to the assembly 14 when in closed position, as shown in FIG. 1 of the drawings.

Whenever air flow in the direction of the arrows A stops or reaches a predetermined minimum condition, insufficient force on the air flow sensing member 62 exists and such force is overcome by the spring 68 which forces the lever 60 toward the stop 66 and opens the bridge contact 56 with respect to the contacts 52 and 54, thereby de-energizing the electrostatic energizing circuit 26 so that continued operation of the electrostatic air cleaning assembly 44 may be interrupted until air flow is again resumed in a sufficient amount to again close the contact 56 relative to the contacts 52 and 54.

It will be understood that the switch composed of the elements 52, 54 and 56 is disclosed only by way of illustration and may actually be a conventional microswitch or any other suitable snap action switch or this air flow responsive means may be any suitable switch such as a pitot tube responsive switch or an air pressure differential switch. Any equivalent means for operating an electrical switch in response to air flow may be used in accordance with the scope of the present invention and such air flow responsive means may be sensitive to air flow relative to the assembly 14 for de-energizing or shutting off power to the electrostatic energizing circuitry 26.

It will be appreciated by those skilled in the art that this air flow responsive means may be disposed either upstream or downstream relative to the assembly 14. However, when the invention is used as an air return duct inlet grill, the air flow responsive means may be downstream relative to the assembly 14.

It will be understood by those skilled in the art that the entire installation of the invention may include no more labor than that required to place the frame 10 in position at the inlet of an air return duct and the plugging in of the prongs 22 of the cord 20 into a conventional 110 volt power supply.

In FIG. 4, an inlet 70 of an air flow return duct 72 receives air from the assembly 14, the air passing through ionizer and to the collector in the conventional manner, whereby material is collected on the collector before the air passes into the inlet 70.

It will be understood that an air flow path in accordance with the present invention may include a duct 74 as indicated by broken lines in FIG. 4 of the drawings which communicates with the inlet side of the assembly 14.

I claim:

1. In an electrostatic air cleaner the combination of: first means forming an air flow path; an electrostatic air cleaning assembly in said path; second means disposed electrostatically to energize said air cleaning assembly; and third means responsive to air flow relative to said assembly, said third means disposed to de-energize said second means to thereby de-energize said assembly when air flow relative to said assembly is substantially reduced said third means comprising a movably mounted aerodynamic flow sensing plate, said plate disposed in said air flow path and in spaced relation to the downstream side of said air cleaning assembly, said plate having opposite sides disposed at an angle to the air flow direction from said air cleaning assembly, said plate having one of said sides adapted to be impinged upon by aerodynamic air flow; and resilient means tending to move said plate in opposition to force of air flow impinging on said plate; and a switch disposed to be operated by movement of said plate.

2. In an electrostatic air cleaner the combination of: a first means forming an air flow path; an electrostatic air cleaner in said path; a power source for energizing said electrostatic air cleaner; an air flow responsive means disposed to be responsive to air flow passing through said path and relative to said electrostatic air cleaner; said air flow responsive means disposed to conduct power from said power source to said electrostatic air cleaner and operable to disconnect and interrupt the flow of power from said power source to said electrostatic air cleaner when a substantially reduced air flow condition exists in said path relative to said electrostatic air cleaner, said air flow responsive means comprising a movably mounted aerodynamic flow sensing plate, said plate disposed in said air flow path, and in spaced relation to the downstream side of said air cleaning assembly, said plate having opposite sides disposed at an angle to the air flow direction from said air cleaning assembly, said plate having one of said sides adapted to be impinged upon by aerodynamic air flow; resilient means tending to move said plate in opposition to force of air flow impinging on said plate; and a switch disposed to be operated by movement of said plate.

3. In an electrostatic air cleaner the combination of: first means forming an air flow path; an electrostatic air cleaning assembly in said path; second means disposed electrostatically to energize said air cleaning assembly; and third means responsive to air flow relative to said assembly, said third means disposed to de-energize said second means to thereby de-energize said assembly when air flow relative to said assembly is substantially reduced said third means comprising a movably mounted aerodynamic flow sensing plate, said plate disposed in said air flow path and in spaced relation to the downstream side of said air cleaning assembly, said plate having opposite sides disposed at an angle to the air flow direction from said air cleaning assembly, said plate having one of said sides adapted to be impinged upon by aerodynamic air flow; and resilient means tending to move said plate in opposition to force of air flow impinging on said plate; and a switch disposed to be operated by movement of said plate; a common frame for said assembly and said second means; said second means stationarily mounted in said frame; said assembly movably mounted in said frame and normally held in said air flow path by said frame.

4. In an electrostatic air cleaner the combination of: first means forming an air flow path; an electrostatic air cleaning assembly in said path; second means disposed electrostatically to energize said air cleaning assembly; and third means responsive to air flow relative to said assembly, said third means disposed to de-energize said second means to thereby de-energize said assembly when air flow relative to said assembly is substantially reduced said third means comprising a movably mounted aerodynamic flow sensing plate, said plate disposed in said air flow path and in spaced relation to the downstream side of said air cleaning assembly, said plate having opposite sides disposed at an angle to the air flow direction from said air cleaning assembly, said plate having one of said sides adapted to be impinged upon by aerodynamic air flow; and resilient means tending to move said plate in opposition to force of air flow impinging on said plate; and a switch disposed to be operated by movement of said plate; a common frame for said assembly and said second means; said second means stationarily mounted in said frame; said assembly movably mounted in said frame and normally held in said air flow path by said frame; complemental contacts carried by said frame and said assembly, respectively, for energizing said electrostatic air cleaning assembly when said assembly is held in said air flow path by said frame; respective contacts on said assembly and said frame disconnected when said assembly is moved substantially out of said air flow path and relative to said frame.

5. In an electrostatic air cleaner the combination of: first means forming an air flow path; an electrostatic air cleaning assembly in said path; second means disposed electrostatically to energize said air cleaning assembly; and third means responsive to air flow relative to said assembly, said third means disposed to de-energize said second means to thereby de-energize said assembly when air flow relative to said assembly is substantially reduced; said third means comprising a movably mounted aerodynamic flow sensing plate, said plate disposed in said air flow path and in spaced relation to the downstream side of said air cleaning assembly, said plate having opposite sides disposed at an angle to the air flow direction from said air cleaning assembly, said plate having one of said sides adapted to be impinged upon by aerodynamic air flow, and resilient means tending to move said plate in opposition to force of air flow impinging on said plate; and a switch disposed to be operated by movement of said plate; a common frame for said assembly and said second means; said second means stationarily mounted in said frame; said assembly movably mounted in said frame and normally held in a first position in said air flow path by said frame; electrical contact means carried by said frame and said assembly, respectively, for energizing said electrostatic air cleaning assembly when said assembly is held in said air flow path by said frame; said electrical contact means on said assembly and said frame being disconnected when said assembly is moved in a direction to a second position substantially out of said air flow path and relative to said frame; a first grounding contact means carried by said frame and a complemental grounding contact means carried by said assembly, said first grounding contact means slightly spaced from said electrical contact means so that movement of said assembly relative to said frame in said direction first causes disconnection of said energizing electrical contact means and then causes engagement of said complemental grounding contact with said first grounding contact means on said frame for grounding said electrostatic air cleaner assembly and thereby dissipating the static charge thereon.

6. In an electrostatic air cleaner the combination of: first means forming an air flow path; an electrostatic air cleaning assembly in said path; second means disposed electrostatically to energize said air cleaning assembly; and third means responsive to air flow relative to said assembly, said third means disposed to de-energize said second means to thereby de-energize said assembly when air flow relative to said assembly is substantially reduced; said third means comprising a movably mounted aerodynamic flow sensing plate, said plate disposed in said air flow path and in spaced relation to the downstream side of said air cleaning assembly, said plate having opposite sides disposed at an angle to the air flow direction from said air cleaning assembly, said plate having one of said sides adapted to be impinged upon by aerodynamic air flow; and resilient means tending to move said plate in opposition to force of air flow impinging on said plate; and a switch disposed to be operated by movement of said plate; said first means being an air return duct having an air inlet disposed to receive air from the inerior of a room, said electrostatic air cleaning assembly being disposed at said duct inlet and forming an air return grill.

7. In an electrostatic air cleaner the combination of: a first means forming an air flow path; an electrostatic air cleaner in said path; a power source for energizing said electrostatic air cleaner; an air flow responsive means disposed to be responsive to air flow passing through said path and relative to said electrostatic air cleaner; said air flow responsive means disposed to conduct power from said power source to said electrostatic air cleaner and operable to disconnect and interrupt the flow of power from said power source to said electrostatic air cleaner when a substantially reduced air flow condition exists in said path relative to said electrostatic air cleaner; said air flow responsive means comprising a movably mounted aerodynamic flow sensing plate, said plate disposed in said air flow path; and in spaced relation to the downstream side of said air cleaning assembly, said plate having opposite sides disposed at angle to the air flow direction from said air cleaning assembly, said plate having one of said sides adapted to be impinged upon by aerodynamic air flow; resilient means tending to move said plate in opposition to force of air flow impinging on said plate; and a switch disposed to be operated by movement of said plate; a common frame for said assembly and said power source; said power source stationarily mounted in said frame; said assembly movably mounted in said frame and held in said air flow path by said frame; said first means being a return air duct having an inlet communicating with the interior of a building room; said frame and said electrostatic air cleaner being disposed at said inlet of said duct and forming a return air grill assembly, whereby air flows through said electrostatic air cleaner and into the inlet of said air return duct.

References Cited

UNITED STATES PATENTS

| | | | |
|---|---|---|---|
| 1,947,447 | 2/1934 | Brassert et al. | 55—106 X |
| 2,756,839 | 7/1956 | Roberts | 55—106 X |
| 3,188,784 | 6/1965 | Nodolf | 55—139 X |
| 3,191,362 | 6/1965 | Bourgeois | 55—139 X |
| 3,222,848 | 12/1965 | Koble | 55—139 X |
| 3,237,383 | 3/1966 | Gilbertson | 55—139 |
| 910,661 | 1/1909 | Geisenhoner | 200—81.9 X |
| 1,351,779 | 9/1920 | Mather | 200—81.9 X |
| 1,372,500 | 3/1921 | Gamille | 200—81.9 |
| 2,127,823 | 8/1938 | Leifheit | 200—81.9 X |
| 2,414,020 | 1/1947 | Clark | 55—210 X |
| 2,427,740 | 9/1947 | Pegg | 55—105 |
| 2,900,042 | 8/1959 | Coolidge et al. | 55—139 |
| 2,952,753 | 9/1960 | Kmiecik et al. | 200—81.9 |

FOREIGN PATENTS 609,426  5/1926  France.

HARRY B. THORNTON, Primary Examiner
D. E. TALBERT, Jr., Assistant Examiner

U.S. Cl. X.R.

55—140, 274, 383, 493; 200—81.9